April 21, 1959  J. F. LEAHY ET AL  2,883,316
WATER VAPOR PERMEABLE, WATERPROOF MATERIALS
Filed June 1, 1955
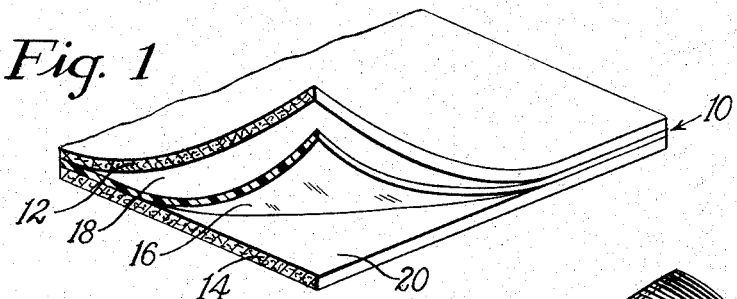
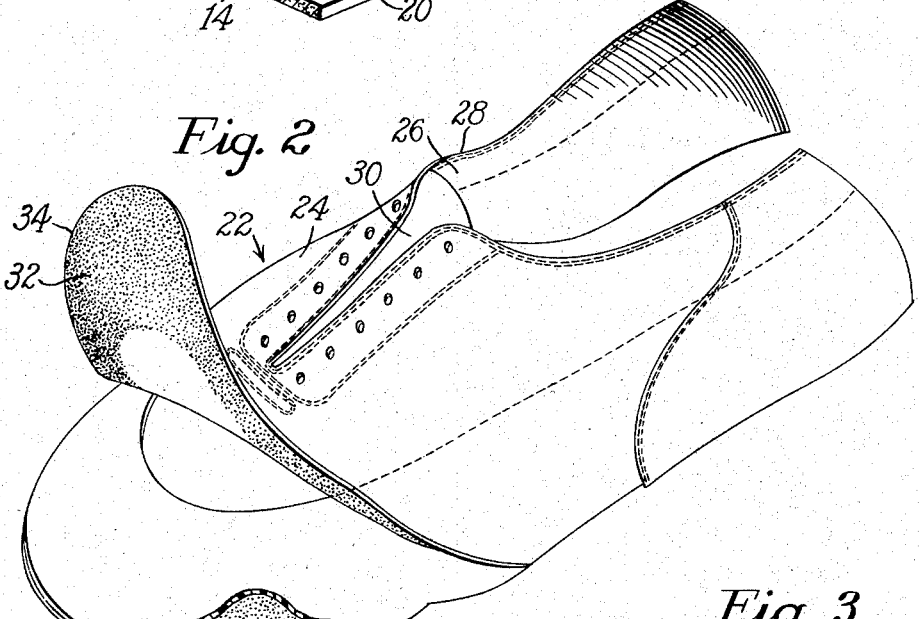
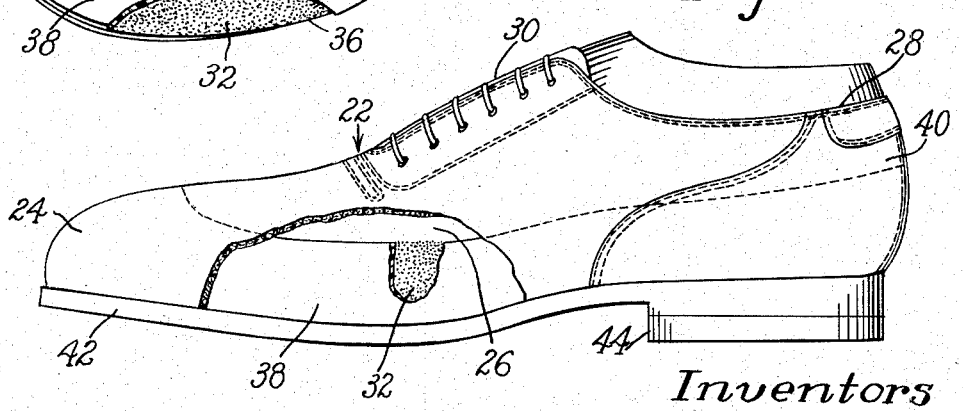
Inventors
James F. Leahy
Frederic C. Merriam
By their Attorney

2,883,316
WATER VAPOR PERMEABLE, WATERPROOF MATERIALS

James F. Leahy, Beverly, and Frederic C. Merriam, Somerville, Mass., assignors to United Shoe Machinery Corporation, Flemington, N.J., a corporation of New Jersey Application June 1, 1955, Serial No. 512,467

5 Claims. (Cl. 154—50)

This invention relates to waterproof leather.

Leather has come to be the preferred material for the manufacture of shoes. It possesses to an outstanding degree flexibility, toughness, resistance to penetration, and wear resistance to provide both a maximum of protection and a maximum of comfort as a foot covering. It has been assumed that since the ability of leather in a shoe to transmit moisture away from the foot is necessary to the health and comfort of the foot, the leather must transmit moisture to the foot during wet weather. Protection of shoes from water by putting on rubbers or application of heavy coats of "dubbin" has been bothersome and both ineffective to keep out water and effective to keep in moisture. Because of the generally unsatisfactory results of the foregoing expedients it has been customary to provide special completely waterproof footwear where extended exposure to wet conditions is expected.

It is a feature of the present invention to provide a leather product possessing substantially undiminished all of the good qualities of previous leathers including permeability to water vapor but possessing the further characteristic that it substantially prevents the passage of liquid water.

According to the present invention we provide a waterproof, water vapor permeable, laminated leather sheet including outer layers of leather and a thin intermediate waterproof, water vapor permeable interlayer. We obtain from this laminate a special cooperative action in which the outer layers of leather provided mechanical strength necessary for use of the laminate and protect the interlayer from mechanical damage such as scratches and perforations through which liquid water might pass; and the interlayer unites the leather layers into a unitary sheet and both prevents passage of liquid water and allows escape of water vapor. It is important that the outer layers possess the character of leather of being uniform to distribute flexing stresses uniformly over the thin interlayer and to avoid localizing the stresses which might be caused by moving or shifting of threads if either of the outer layers were of woven fabric. On the other hand, the interlayer must be of a material which will transmit water vapor, and possess substantial strength to prevent separation of the outer layers and be capable of bonding easily and strongly to leather.

The invention will be described more fully in connection with the drawings, in which, Fig. 1 is an angular view on an enlarged scale of laminated leather according the present invention with the layers spread apart at one corner;

Fig. 2 is an angular view of an unlasted shoe upper including leather and resin layers for the construction of a waterproof shoe; and Fig. 3 is an elevational view of a waterproof shoe with portions broken away to show the relation of the layers.

The laminated leather sheet 10 of the present invention comprises outer layers 12 and 14 of leather uniformly secured together by an intervening continuous, non-porous layer 16 bonded to the inner surfaces of the two layers 12 and 14 to hold them together against separating stresses during use so that the three layers function as an integral sheet. The intervening layer 16 is a thin film or sheet, preferably resinous, which possesses a combination of water vapor permeability and water resistance together with flexibility and toughness. The term "water vapor permeability" refers to a physicochemical transmission by which water molecules pass through a body by transfer from hydrophilic radical to hydrophilic radical although the body itself is non-porous, as distinguished from physical passage of the water through openings in sheet material whether the openings be small, i. e. pores, or larger openings visible to the naked eye.

As discussed more fully in the copending application of Frederic C. Merriam and Norman M. Weiderhorn, Serial No. 344,416, filed March 24, 1953, entitled Surgical Dressings, now abandoned, and the application of Frederic C. Merriam, Serial No. 394,988, filed November 30, 1953, entitled Water Vapor Permeable Resins, a number of resinous copolymers of acrylic acid, methacrylic acid and acrylamide with various acrylic and methacrylic esters are imprevious to passage of liquid water, but are water vapor permeable through the action of the acid or amide component of the resin which provide radicals having an affinity for water which serve to pass along water molecules through a body of the material.

The resinous copolymers referred to in the above-mentioned applications are suitable materials of which to make the non-porous interlayer of the laminated leather sheet of the present invention. However, because of the supporting effect of the leather layers on the interlayer somewhat wider ranges of proportions may be used successfully. Resins disclosed in those applications suitable for the present use include copolymers of (a) acrylic acid, methacrylic acid, acrylamide or mixtures of these with (b) acrylic esters or methacrylic esters of saturated monohydroxy alcohols or saturated alkoxy monohydroxy alcohols. The alcohol components of the esters may have from 2 to 12 carbon atoms and the alkoxy groups in the alkoxy monohydroxy alcohols may have from 1 to 8 carbon atoms, the remaining alcohol portion having from 2 to 4 carbon atoms. The ester component of the copolymer may constitute from 30 to 70 mol percent of the copolymer and the copolymer may contain up to 60 mol percent of methacrylic components.

Particular resins described in the above referred to application of Merriam and Weiderhorn which have been found useful in the form of resin films for the interlayer of the laminated sheet of the present invention include: a copolymer containing 63.4 mol percent of ethyl acrylate and 36.6 mol percent of acrylic acid (Example I), a copolymer of 50.5 mol percent n-hexyl acrylate and 49.5 mol percent acrylic acid (Example V), a copolymer of 56 mol percent n-butyl methacrylate and 44 mol percent acrylic acid (Example III), a copolymer of 62 mol percent of n-butyl acrylate and 38 mol percent methacrylic acid (Example IV), and a copolymer obtained by polymerization of a mixture of 25 gms. of ethyl acrylate, 5 gms. of hexyl acrylate and 18 gms. of acrylamide (Example IX). Particular resins described in the above referred to application of Frederic C. Merriam and found useful in the laminated leather sheet of the present invention include: a copolymer of 58 mol percent butoxyethyl methacrylate and 42 mol percent of acrylic acid (Example I), a copolymer of 36 mol percent ethoxyethyl acrylate, 10 mol percent of n-octyl acrylate and 54 mol percent acrylic acid (Example III), a copolymer obtained by polymerization of 15 parts by weight ethoxyethyl acrylate and 7.5 parts by weight of acrylamide (Example V), and a copolymer of 45 mol percent ethyl acrylate, 18 mol percent of 3-ethoxypropyl acrylate and 37 mol percent of acrylic acid (Example VIII).

Alcohol soluble, high molecular weight linear polyamides such as those disclosed in the U. S. patent to Brubaker et al. 2,285,009, of June 2, 1942, are also quite satisfactory. While these resins are preferred, other water impervious, tough, flexible sheet materials possessing "water vapor permeability" and the ability to bond to leather may be used. Thus sheet gelatine is useful for less severe duty. It is noted that residual tanning agents in leather seem to exert an insolubilizing effect on the gelatine.

The water vapor permeabilities of films are different for films of different materials and it is preferred to employ films with higher values of water vapor permeability. The quantity of water vapor which will pass through a unit area of a film varies inversely as the thickness of the film and with the materials employed at present it has been found important to use films of thinness arranging from two to not more than about 10 mils. Films from 4 to 6 mils in thickness have been found to possess a combination of ability to transmit water vapor at a useful rate together with sufficient mechanical strength for ease in handling in the process of forming the laminate. Where the films form a layer in leather laminates for use in shoes, the water vapor permeability should not be less than about $10 \times 10^{-8}$ gms./hr.$\times$cm.$\times$mm. of Hg water vapor pressure as determined by the test described in an article by Taylor, Herrmann and Kemp in "Industrial and Engineering Chemistry," vol. 28, 1936, pages 1255–1263.

The nature of the leather layers of the laminated leather sheet does not appear to be critical and leathers of various tannages and of various thicknesses have been employed successfully.

The laminate may be formed by known methods of securing layers 12 and 14 of leather to the opposite surfaces of the film 16. A convenient method involves coating the surfaces of the leather layers 12 and 14 to be joined with primer coatings 18 and 20 respectively, the coatings preferably being applied by spraying or brushing the layers with a dilute solution of the water vapor permeable material in a volatile solvent. The layers of leather 12 and 14 may be assembled with the film 16 between them after a major portion of the solvent of the primer coating has evaporated but while the primed surfaces are still in condition capable of bonding with the surfaces of the film.

Surprisingly, it has been found that where acrylic copolymers were used the properties of water vapor permeability or resistance to passage of liquid water were reduced where it was attempted to join the surfaces of two layers of leather each of which had been coated with a solution of an otherwise suitable material but where a preformed film was not interposed between the surfaces of the leather. No completely satisfactory explanation of this phenomenon has been found although a possible explanation is that so much coating solution is necessary to provide effective union between the leather layers that the solution penetrates and fills the pores of the leather in a manner markedly reducing the desired water vapor permeability, and that working of the leather disrupts the continuity of the barrier to permit passage of liquid water. It is to be understood that this explanation is merely offered as of possible assistance and that patentability of the invention is not dependent upon the correctness of the theory advanced.

Waterproofness of the leather laminate has been tested in a device which holds a bent portion of the leather beneath the surface of the body of water and subjects it to repeated flexing and slight tension according to the method given in "Methods of Testing the Water Resistance of Army Combat Boots" by Meith Maeser, "Journal of American Leather Chemists Association," XLII, 390, 1946. It has been found that the leather laminate will withstand thousands of cycles in this testing apparatus whereas ordinary leather even where treated with the usual waterproofing material such as Army type "dubbin" and the like will go through only a relatively few cycles before wetting through.

Examination of the samples after the flexing test showed that the leather on the side facing the water was saturated but that the leather on the side away from the water was dry and in good condition. No delamination of the leather laminate was observed.

The leather laminate has also been tested from the standpoint of water vapor permeability in a standard test (ASTM E96–53T) wherein circular specimens of the leather material are placed over a cup containing water, the cup and specimen placed in an atmosphere of 50% humidity with active circulation of air and the quantity of moisture evaporated from the cup is observed. Other tests have been used such as that given by R. L. Taylor, D. B. Herrmann and R. A. Kemp, "Industrial and Engineering Chemistry," 28, 1255, 1936.

In a test of a laminate of two layers of leather with an interlayer seven mils thick of a copolymer of 30.7 mol percent acrylic acid, 18.7 mol percent ethoxyethyl acrylate and 57.3 mol percent butyl acrylate, there was obtained a water vapor permeability factor $D = 1070 \times 10^{-8}$, expressed as grams of water vapor transmitted per hour through a centimeter cube under a water vapor differential of 1 mm. of mercury at constant temperature of 72° F. In this case the D factor of the leather alone was $1230 \times 10^{-8}$ and the permeability of the film alone was only $39 \times 10^{-8}$. The improvement in water vapor permeability of the laminate over that of the film alone is believed to be due to the action of the leather in conducting moisture to the film for passage therethrough.

Shoes may be made by any of the known shoemaking methods using a preformed laminate of two layers of leather with a waterproof water vapor permeable interlayer.

It has been found also that a satisfactory shoe may be obtained where the outer leather and lining leather of a shoe upper are laminated with a suitable interlayer during the course of shoemaking.

In accordance with this latter procedure, a shoe upper 22 is prepared (see Fig. 2) in which the outer leather 24 and a leather lining 26 are secured together, for example by stitching 28 along the top line and along the edges of the lacing opening 30, the back seam, however, not being made at this time. The adjacent faces of the upper leather 24 and of the leather lining 26 are given a priming coat 32 along an area extending up about 1½" from the edges 34 and 36 of the outer leather 24 and lining 26, respectively. Suitably, the primer coat 32 may be applied as a relatively dilute, for example 7½% solution of resin in a volatile solvent, for example, methanol. Using a resinous copolymer of about 40 mol percent acrylic acid, 15 mol percent ethoxyethyl acrylate, and 45 mol percent of butyl acrylate (which may be prepared in accordance with the procedure outlined in the copending application, Serial No. 394,988, referred to herein above) a satisfactory primer coat 32 may be provided by allowing a drying period of from 3 to 5 minutes after a first coat of the solution, applying a second coat and permitting to dry for from 5 to 10 minutes. At this time a strip 38 of the same resin 7 mils in thickness and cut to an outline corresponding to the primer coated area of the outer leather 24 and lining 26 is assembled between them and joined initially to them by rolling with a hand roller (not shown). Thereafter, suitably at the expiration of about 1 hr., the assembly is subjected to a substantial pressure which may be of the order of 2,000 lbs. per sq. inch at room temperature. Where, as in the upper shown in Fig. 2, eyelets have already been placed in the shoe upper, a rubber pad is used to prevent damage to the eyelets.

After the lamination step, further operations such as completing the backseam 40, lasting, attaching the sole 42 and heel 44, etc. leading to the completion of the shoe are carried out. It is desirable after sewing the backseam 40 and other seams in the shoe upper to apply a coating of rubber cement or other waterproofing coating to the seams to seal the stitch holes against entrance of moisture.

Shoes thus made were subjected to a severe wear testing, being worn by greens keepers of a golf course in all weathers. At the conclusion of the test the report indicated that the shoes successfully resisted water and that the shoes were comfortable, i.e. no burning sensation or excessive dampness of the feet were observed. These results show that the shoes from the leather laminate were both waterproof and water vapor permeable. After completion of the wear test, a pair of the wear test shoes was cut open and the leather laminate examined. It appeared that the bond between the layers of leather and the intervening resin film was, if anything, stronger than at the start of the wear tests since the leather and resin film could not be separated.

Having thus described our invention, what we claim as new and desire to secure by Letters Patent of the United States is:

1. A waterproof, water vapor permeable, laminated leather sheet comprising layers of leather joined on their inner surfaces to and connected together in laminated relation by an intermediate non-porous continuous preformed film of a member of the group consisting of gelatin, alcohol soluble, high molecular weight linear polyamides, and resinous copolymers of (a) at least one member selected from the group consisting of acrylic acid, methacrylic acid and acrylamide and (b) at least one member selected from the group consisting of acrylic esters and methacrylic esters of saturated monohydroxy alcohols and saturated alkoxy monohydroxy alcohols, said alcohols having from 2 to 12 carbon atoms, the alkoxy groups in said alkoxy monohydroxy alcohols having from 1 to 8 carbon atoms and the remaining alcohol portion having from 2 to 4 carbon atoms, the ester component of said copolymer constituting from 30 to 70 mol percent of the copolymer and said copolymer not containing more than 60 mol percent of methacrylic components, said film being from 2 to 10 mils thick and being impervious to liquid water but having a water vapor permeability not substantially less than $10 \times 10^{-8}$ grams/hr.$\times$com.$\times$mms. of Hg water vapor pressure.

2. A waterproof, water vapor permeable, laminated leather sheet comprising layers of leather joined on their inner surfaces to and connected together by an intermediate, continuous, non-porous substantially water-insoluble film of a resinous copolymer of from 30 to 70 mol percent of ethyl acrylate and from 70 to 30 mol percent of acrylic acid, said film being from 2 to 10 mils in thickness and having a water vapor permeability not substantially less than $10 \times 10^{-8}$ grams/hr.$\times$ccm.$\times$mm. of Hg water vapor pressure and being impervious to liquid water.

3. A waterproof, water vapor permeable, laminated leather sheet comprising layers of leather joined on their inner surfaces to and connected together by an intermediate, continuous, non-porous, substantially water-insoluble film of a resinous copolymer of ethoxyethyl acrylate, n-octyl acrylate and acrylic acid, the ester components of said copolymer constituting from 30 to 70 mol percent of the copolymer and the acid component constituting from 70 to 30 mol percent of the copolymer, said film being from 2 to 10 mils in thickness and having a water vapor permeability not substantially less than $10 \times 10^{-8}$ grams/hr.$\times$ccm.$\times$mm. of Hg water vapor pressure and being impervious to liquid water.

4. A waterproof, water vapor permeable, laminated leather sheet comprising layers of leather joined on their inner surfaces to and connected together by an intermediate, continuous, non-porous, substantially water-insoluble film of a resinous copolymer of ethyl arcrylate, 3-ethoxypropyl acrylate and acrylic acid, the ester components of said copolymer constituting from 30 to 70 mol percent of the copolymer and the acid component constituting from 70 to 30 mol percent of the copolymer, said film being from 2 to 10 mils in thickness and having a water vapor permeability not substantially less than $10 \times 10^{-8}$ grams/hr.$\times$ccm.$\times$mm. of Hg water vapor pressure and being impervious to liquid water.

5. A waterproof, water vapor permeable, laminated leather sheet comprising layers of leather joined on their inner surfaces to and connected together by an intermediate, continuous, non-porous, substantially water-insoluble film of a resinous copolymer of from 30 to 70 mol percent n-butyl methacrylate and from 70 to 30 mol percent acrylic acid, said film being from 2 to 10 mils in thickness and having a water vapor permeability not substantially less than $10 \times 10^{-8}$ grams/hr.$\times$ccm.$\times$mm. of Hg water vapor pressure and being impervious to liquid water.

References Cited in the file of this patent

UNITED STATES PATENTS

| | | |
|---|---|---|
| 117,168 | Gould | July 18, 1871 |
| 483,289 | Roche | Sept. 27, 1892 |
| 1,309,461 | Cooke | July 8, 1919 |
| 2,261,313 | Thinius et al. | Nov. 4, 1941 |
| 2,285,009 | Brubaker et al. | June 2, 1942 |
| 2,371,868 | Berg et al. | Mar. 20, 1945 |
| 2,440,092 | Hyman et al. | Apr. 20, 1948 |
| 2,607,711 | Hendricks | Aug. 19, 1952 |
| 2,673,171 | Bellavoine | Mar. 23, 1954 |